United States Patent
Franklin et al.

(10) Patent No.: US 10,010,145 B2
(45) Date of Patent: Jul. 3, 2018

(54) ENHANCED SIDEWALLS OF AN ACCESSORY DEVICE FOR AN ELECTRONIC DEVICE

(71) Applicant: Apple Inc., Cupertino, CA (US)

(72) Inventors: Jeremy C. Franklin, San Francisco, CA (US); James A. Stryker, Mountain View, CA (US); Aaron P. Beese, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/263,784

(22) Filed: Sep. 13, 2016

(65) Prior Publication Data

US 2017/0085286 A1    Mar. 23, 2017

Related U.S. Application Data

(60) Provisional application No. 62/220,845, filed on Sep. 18, 2015, provisional application No. 62/220,897, filed on Sep. 18, 2015.

(51) Int. Cl.
| | |
|---|---|
| *A45C 11/00* | (2006.01) |
| *H04M 1/23* | (2006.01) |
| *H04B 1/3888* | (2015.01) |
| *H04M 1/18* | (2006.01) |

(52) U.S. Cl.
CPC ............... *A45C 11/00* (2013.01); *H04M 1/23* (2013.01); *A45C 2011/002* (2013.01); *H04B 1/3888* (2013.01); *H04M 1/185* (2013.01); *H04M 1/236* (2013.01)

(58) Field of Classification Search
CPC ........ A45C 2011/001; A45C 2011/002; A45C 2011/003; H04B 1/3888; H04M 1/04; G06F 1/1656; H05K 5/0004
USPC ....................................... 455/575.8
See application file for complete search history.

(56) References Cited

U.S. PATENT DOCUMENTS

| | | | |
|---|---|---|---|
| 8,346,183 B2 * | 1/2013 | Prest ................ | B29C 45/14639 361/679.3 |
| 8,395,894 B2 | 3/2013 | Richardson et al. | |
| 8,509,864 B1 * | 8/2013 | Diebel .................. | G03B 17/02 361/679.32 |
| 8,738,104 B2 * | 5/2014 | Yeates ................... | B22D 19/04 361/679.3 |

(Continued)

FOREIGN PATENT DOCUMENTS

WO    WO 2015/034719    *    3/2015 ............. A45C 11/00

*Primary Examiner* — Duc M Nguyen
(74) *Attorney, Agent, or Firm* — Dickinson Wright RLLP

(57) ABSTRACT

An accessory device is described. The accessory device may include a base region and sidewalls that combine with the base region to secure an electronic device with the accessory device. The accessory device may include a rigid layer having openings in at least some corners of the rigid layer. In order to facilitate insertion and extraction of the electronic device, an elastic material disposed in the openings may join with two sidewalls at the corners, allowing the sidewalls to move or bend with respect to other sidewalls. The accessory device may include a protective layer embedded in a sidewall to provide support to an opening formed in the sidewall. The sidewall may include a protrusion supported by features embedded in sidewall to facilitate pressing the protruding feature, which corresponds to pressing a button of the electronic device.

20 Claims, 13 Drawing Sheets

(56) References Cited

U.S. PATENT DOCUMENTS

| | | | |
|---|---|---|---|
| 9,419,669 B2* | 8/2016 | Smith | A45C 5/02 |
| 2011/0163642 A1* | 7/2011 | Rohrbach | A45C 9/00 |
| | | | 312/223.1 |
| 2011/0279824 A1* | 11/2011 | Blomberg | G02B 26/001 |
| | | | 356/519 |
| 2012/0018325 A1 | 1/2012 | Kim | |
| 2014/0110275 A1 | 4/2014 | Wu et al. | |
| 2014/0243053 A1* | 8/2014 | Hynecek | A45C 11/00 |
| | | | 455/575.8 |
| 2014/0339104 A1* | 11/2014 | Magness | A45C 11/00 |
| | | | 206/37 |
| 2015/0065208 A1* | 3/2015 | Balaji | H04M 1/04 |
| | | | 455/575.8 |
| 2015/0194995 A1* | 7/2015 | Fathollahi | H04B 1/3888 |
| | | | 455/575.8 |
| 2015/0195938 A1* | 7/2015 | Witter | H05K 5/03 |
| | | | 206/521 |
| 2015/0270734 A1* | 9/2015 | Davison | H02J 7/0054 |
| | | | 320/103 |
| 2015/0295615 A1* | 10/2015 | Smith | A45C 5/02 |
| | | | 455/575.8 |
| 2016/0088414 A1* | 3/2016 | Zheng | H04R 31/00 |
| | | | 381/174 |
| 2016/0198026 A1* | 7/2016 | Del Toro | H04M 1/0202 |
| | | | 455/575.8 |
| 2017/0049000 A1* | 2/2017 | Kang | H05K 5/03 |

* cited by examiner

ENHANCED SIDEWALLS OF AN ACCESSORY DEVICE FOR AN ELECTRONIC DEVICE

CROSS-REFERENCE TO RELATED APPLICATION(S)

This application claims the benefit of priority under 35 U.S.C. § 119(e) to i) U.S. Provisional Application No. 62/220,845, filed on Sep. 18, 2015, titled "ENHANCED SHELL GEOMETRY FOR A FLEXIBLE CASE FOR A PORTABLE ELECTRONIC DEVICE," and ii) U.S. Provisional Application No. 62/220,897, filed on Sep. 18, 2015, titled "ENHANCED SIDEWALLS OF AN ACCESSORY DEVICE FOR AN ELECTRONIC DEVICE," the disclosure of each is incorporated herein by reference in its entirety.

FIELD

The described embodiments relate to an accessory device for an electronic device. In particular, the described embodiments relate to an accessory device having sidewalls with enhanced support. Also, methods of forming an accessory device that include leather are described.

BACKGROUND

Accessory devices may be used to provide a protective cover for electronic devices. In some instances, in order to provide an aesthetically pleasing appearance, an accessory device includes leather. The leather may cover a shell of the accessory device and define an exterior of the accessory device.

However, using leather as a layer of material has drawbacks. For example, leather is generally a flat piece of material having a defined thickness, making it difficult to conform to other materials, such as the shell. Further, leather generally includes compressible properties. As a result, when leather is formed over a location of the accessory device corresponding to a button of an electronic device, a user depressing the leather may only compress the leather and may not depress the button.

SUMMARY

In one aspect, an accessory device for an electronic device having a button is described. The accessory device may include a first layer that includes a protrusion in a location corresponding to the button. The first layer may include a first recessed region surrounding the protrusion. The accessory device may further include a second layer comprising a second recessed region bonded with the first recessed region defining a bonding location circumferentially surrounding the protrusion. The accessory device may further include a fill material enclosed within the bonding location between the first layer and the second layer to support the protrusion.

In another aspect, an accessory device for an electronic device is described. The accessory device may include a first layer formed from a first material. The accessory device may further include a second layer engaging the first layer. The accessory device may further include a sacrificial layer embedded in the first layer. The sacrificial layer may be positioned to protect the second layer from a cut to the first layer and the sacrificial layer that defines an opening to receive a third layer formed from a second material different from the first material.

In another aspect, a method for forming an accessory device for an electronic device having a button is described. The method may include bonding a first layer with a second layer at a bonding location defined by a first recessed region of the first layer and a second recessed region of the second layer. The first layer may a protrusion in a location corresponding to the button. The protrusion may be circumferentially surrounded by the first recessed region. The method may further include enclosing a fill material within the bonding location between the first layer and the second layer to support the protrusion.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
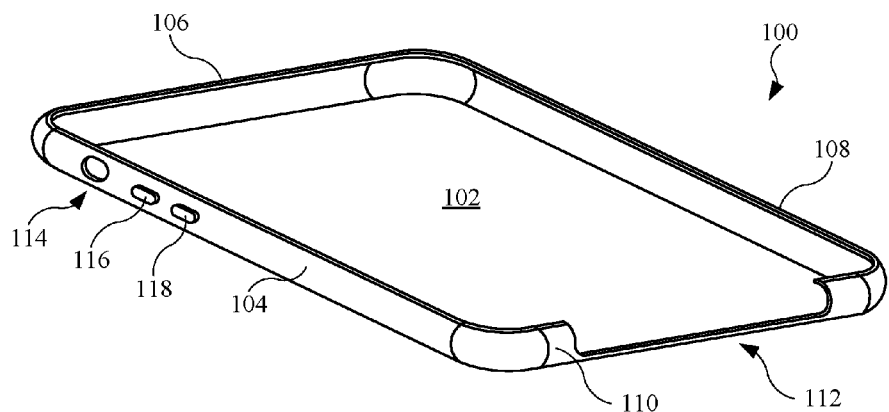
FIG. 1 illustrates an isometric view of an embodiment of an accessory device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to an accessory device designed for use with an electronic device. In particular, the accessory device may include enhancements that facilitate inserting the electronic device into the accessory device, and/or extracting the electronic device from the accessory device. For example, the accessory device may include a base region and several sidewalls extending from the base region. The sidewalls may include a rigid material, such plastic. However, some sidewalls may be separated by an opening, or openings, defined by a region free of the rigid material. In some instances, the opening is located at a corner between two sidewalls. The opening may be filled by an elastomer, or other elastically deformable material, bonded with the two sidewalls. The elastomer allows the sidewalls (to which the elastomer is bonded) to move freely with respect to one another. This allows the accessory device to open further to receive the electronic device and/or remove the electronic device. Accordingly, due in part to the elastomer, the accessory device becomes more flexible, as compared to the sidewalls coupled together by the rigid material that extends along the two sidewalls without the opening.

The elastomer may include a flexible material designed to stretch, or elastically stretch, in response to a pulling force or strain on the flexible material, without permanently deforming. For example, while inserting an electronic device into the accessory device, a force may be applied to one of the sidewalls having the elastomer bonded thereto, causing the sidewall to bend or move. Further, the elastomer may allow the sidewall to bend or move with respect to the other sidewall having the elastomer bonded thereto. In this manner, the accessory device may maintain a substantially rigid shell (along the base region and the sidewalls) while having flexible regions (at the openings that void of the shell) allowing for easier insertion and/or extraction of an electronic device. Further, the thickness of the shell may change according to a desired manufacturing thickness with little or no effect on the insertion and/or extraction of the electronic device.

Also, in order for the accessory device to enhance a retaining force to retain the electronic device with the accessory device, the sidewalls may include varied lengths. For example, one of the sidewalls may include a first length allowing the sidewall to extend around and over the electronic device to a first distance. The accessory device may include an additional sidewall having a second length allowing the additional sidewall to extend around and over the electronic device to a second distance that is greater than the first distance. The second (extended) distance may provide an additional securement of the electronic device. In this manner, the accessory device may include an asymmetric geometry as the sidewalls extend to different lengths.

In addition to the varied lengths, the sidewalls may include additional asymmetric properties. For example, in the embodiment previously described, the sidewall extending to the first distance may include a first thickness, with the thickness defined by the material used to form the sidewall. However, the additional sidewall extending to the second distance may include a second thickness greater than the first thickness. In this regard, the second thickness may allow the additional sidewall to increase a pressure or frictional force against the electronic device, and may prevent the electronic device from exiting the accessory device when the accessory device is dropped.

Further, at least one of the sidewalls of the accessory device may include an opening designed to receive a switch or other control input feature. Alternatively, the opening may be positioned in a location corresponding to a port of the electronic device, with the port configured to receive an audio jack for a headset. In either event, in order to reinforce the opening, the sidewall may include a protective layer disposed between two or more layers of material that form the sidewall. The protective layer may include a fibrous material formed from a liquid crystal polymer.

Also, the accessory device may include one or more protruding features in at least one of the sidewalls. The protruding feature may be positioned in a location corresponding to a button, switch, or control input feature of the electronic device. In some instances, the protruding feature is reinforced by a filler material designed to assist in pressing the button of the electronic device. Further, when the accessory device includes leather, or leather-like material, on an exterior region of the accessory device, the leather may undergo several operations designed to form the protruding feature. For example, a de-boss tool may be used to press the leather. In addition, the de-boss tool may form a recessed region defined by an indention around the protruding feature to enhance an appearance of the protruding feature. This may form a button-like feature on the accessory device, thereby providing an indication of the location of the button of the electronic device (when the electronic device is installed in the accessory device). Further, in some cases, the leather may wrap around the exterior region and an interior region, and the de-boss tool may press the interior region to form a recessed region on not only the exterior region, but also the interior region.

These and other embodiments are discussed below with reference to FIGS. 1-24. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with the described embodiments. The accessory device 100 may be designed to receive and protect an electronic device (not shown). In this regard, accessory device 100 may include a base region 102 that provides a generally flat receiving surface for an electronic device. The accessory device 100 may further include several sidewalls extending from the base region 102 that combine to provide a retaining force to an electronic device. For example, the accessory device 100 may include a first sidewall 104, a second sidewall 106, and a third sidewall 108. Further, the accessory device 100 may include a fourth sidewall 110 having two portions separated by a channel 112 allowing for connectivity (in the form of electrical communication) between an electronic device and another device (not shown), such as a headset. The channel 112 may also allow for an electronic device to be electrically coupled with a docking station (not shown) without physical interference from the accessory device 100. A docking station may be associated with a radio device and/or charging port configured to receive the electronic device positioned in the accessory device 100. The sidewalls may include several layers that combine to form the accessory device 100. Further, the material make-up of the accessory device 100 may allow one or more of the sidewalls to move or bend with respect to the remaining sidewalls, which may facilitate insertion of an electronic device into the accessory device 100, or extraction of an electronic device from the accessory device 100. This will be shown and described below.

Also, as shown, the first sidewall 104 may include an opening 114 positioned in a location corresponding to a switch or control of an electronic device, when the electronic device is positioned in the accessory device 100. The first sidewall 104 may also include several protruding features, such as a first protruding feature 116 and a second protruding feature 118, both of which are positioned in a location corresponding to buttons of an electronic device, when the electronic device is positioned in the accessory device 100. This may allow a force or depression of an aforementioned protruding feature to correspond to a depression of a button of the electronic device to control a function of the electronic device. While a discrete number of openings and protruding features are shown on the first sidewall 104, the number of openings and protruding features may vary. Also, the second sidewall 106 and/or the third sidewall 108 may include one or more openings, and/or one or more protruding features.

Also, although not shown, the base region 102 may include an opening having a size and a shape to allow for a camera module and a flash module to capture images. Accordingly, the opening may be positioned in a location corresponding to the camera module and the flash module of an electronic device, when the electronic device is positioned in the accessory device 100.

Figure 2:
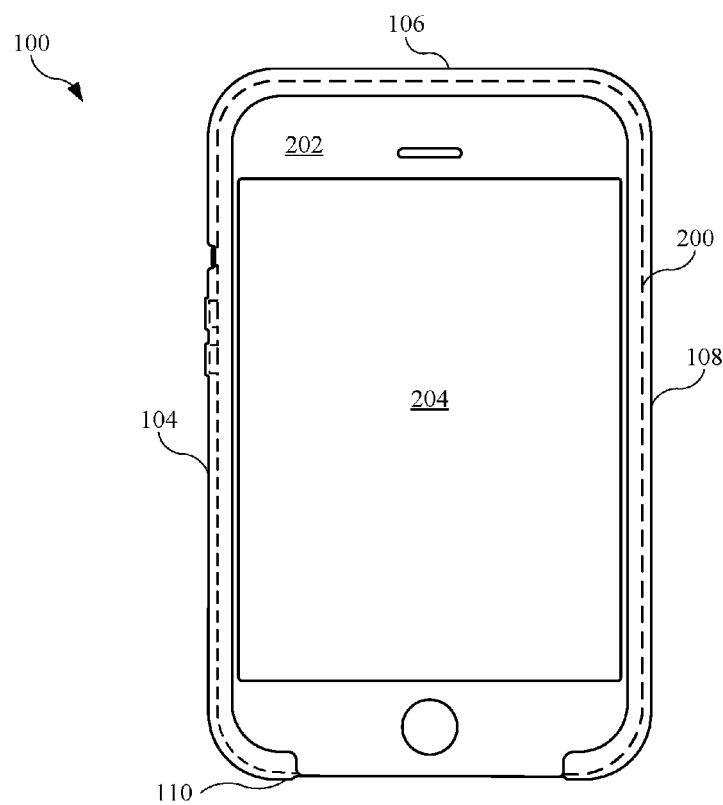
FIG. 2 illustrates a plan view of the accessory device shown in FIG. 1, further showing an electronic device disposed in the accessory device.

FIG. 2 illustrates a plan view of the accessory device 100 shown in FIG. 1, further showing an electronic device 200 disposed in the accessory device 100. In some embodiments, the electronic device 200 is a tablet computing device. In the embodiment shown in FIG. 2, the electronic device 200 is portable electronic device, also referred to as a smartphone. As shown, the first sidewall 104, the second sidewall 106, the third sidewall 108, and the fourth sidewall 110 may each wrap around corresponding sidewalls of the electronic device 200, and in some cases, may extend over a portion of a protective layer 202 of the electronic device 200. The protective layer 202 may include a transparent material, such as glass or any other suitable material that may cover and protect a display assembly 204 of the electronic device 200, while also allowing the display assembly 204 to present visual information to a user without obstruction.

Figure 3:
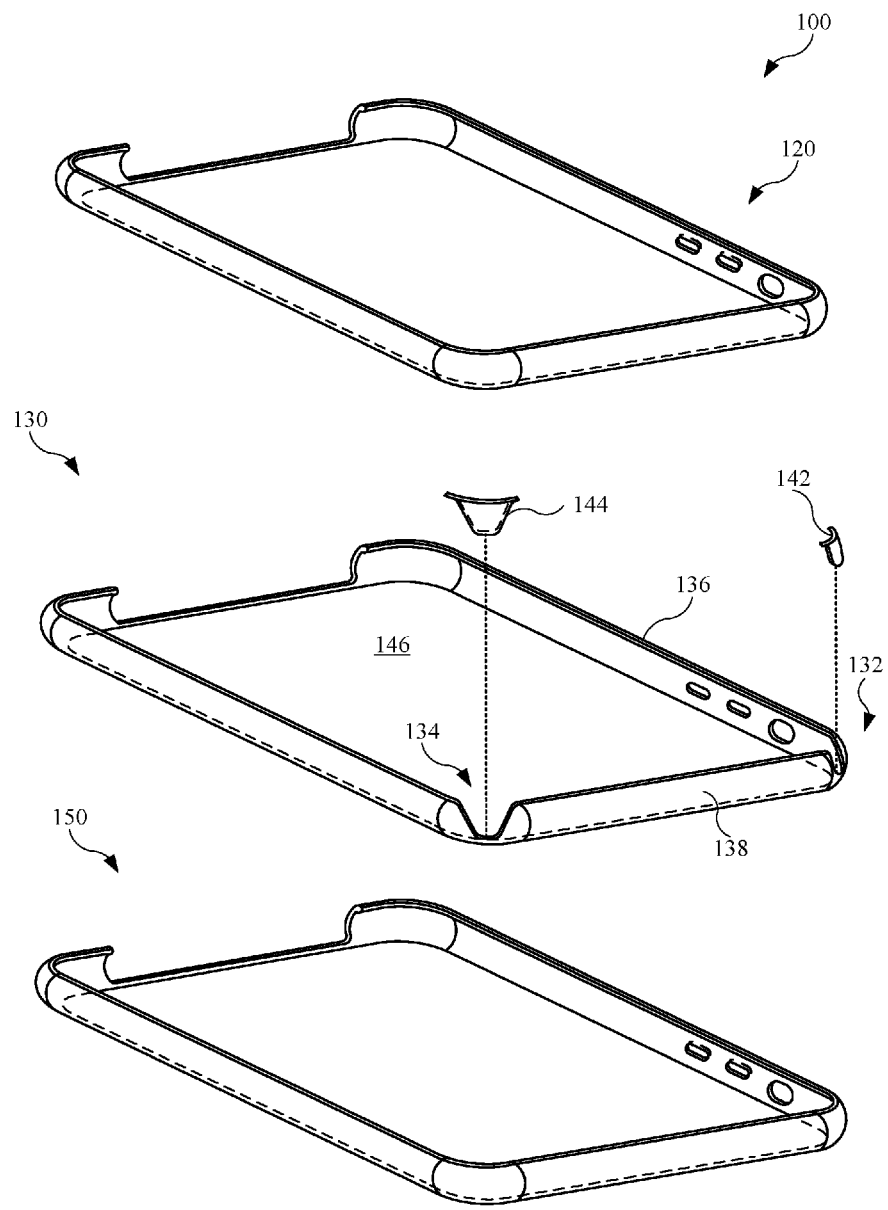
FIG. 3 illustrates an exploded view of the accessory device shown in FIG. 1, showing several features of the accessory device.

FIG. 3 illustrates an exploded view of the accessory device 100 shown in FIG. 1, showing several features of the accessory device 100. For example, the accessory device 100 may include a first layer 120 defining an interior region of the accessory device 100. The first layer 120 may be substantially engaged with an electronic device (such as the electronic device 200, shown in FIG. 2) when the electronic device is positioned in the accessory device 100. In some embodiments, the first layer 120 includes a fabric layer that may include, for example, microfiber. However, the first layer 120 may also be a different material that does not scratch or cause damage to an electronic device.

The accessory device 100 may also include a second layer 130 that provides support and structural rigidity to the accessory device 100. In some embodiments, the second layer 130 includes a relatively rigid material such as a polycarbonate ("PC") material or nylon. However, the second layer 130 may include a polymeric material, or a combination of polymeric materials. In this regard, the second layer 130 may be referred to as a shell that substantially defines a size and a shape of the accessory device 100, and may further include a size and a shape corresponding to that of an electronic device. In other words, the second layer 130 includes a size and a shape that, in addition to several other layers, allows the accessory device 100 to receive the electronic device. Also, the second layer 130 may undergo a molding operation in a molding tool (not shown) to form the second layer 130 to a desired size and shape. Accordingly, the second layer 130 may initially include a material in liquid form that later cures in the molding tool.

Typically, when the second layer 130 is formed from a relatively rigid material (for example, from one of the aforementioned materials), the accessory device 100 may become rigid or stiff. Further, the rigidity or stiffness of second layer 130 may increase with an increasing thickness of the second layer 130. However, the second layer 130 may be modified to allow for additional flexibility in certain locations. For example, the second layer 130 may include a first opening 132 and a second opening 134, with an opening defined as a space or void in the second layer 130 free of material used to form the second layer 130. The first opening 132 and the second opening 134 may be formed during the molding operation of the second layer 130, or may be formed by a cutting operation subsequent to the molding operation. Further, the openings may in a corner region, or corner regions, where the sidewalls of the second layer 130 would otherwise connect.

The first opening 132 and the second opening 134 may allow for additional flexibility of the sidewalls of the second layer 130. For example, due in part to the first opening 132, a first sidewall 136 of the second layer 130 may move or bend independently with respect to a second sidewall 138 of the second layer 138. While the flexibility may be increased, some of the structural integrity may be compromised, which may cause an electronic device to fall out of the accessory device 100 when, for example, a load or force is applied to the accessory device 100. However, the second layer 130 may be further modified to include an elastic material that increases the integrity of the second layer 130 at the openings. For example, the first opening 132 and the second opening 134 may include a first elastic material 142 and a second elastic material 144, respectively. In some embodiments, the first elastic material 142 and the second elastic material 144 are chemically bonded with the second layer 130 along a surface defined by the first opening 132 and the second opening 134. Also, in some embodiments, the first opening 132 and the second opening 134 extend partially along only the corners of the second layer 130. In the embodiment shown in FIG. 3, the first opening 132 and the second opening 134 extend to a base region 146 of the second layer 130. This may allow the sidewalls to include independent and flexible movement with respect to the base region 146 and to other sidewalls.

In some embodiments, the first elastic material 142 and the second elastic material 144 includes an elastomer having a relatively high failure strain and a relatively low Young's modulus. This may allow the first elastic material 142 and the second elastic material 144 to non-permanently deform and elastically stretch in response to a force applied to a sidewall, or sidewalls, adjacent to first elastic material 142 and/or the second elastic material 144. In other words, the elastic material can stretch when a force is applied to a sidewall to which the elastic material is bonded. This will be shown below.

Also, the accessory device 100 may include a third layer 150. In some embodiments, the third layer 150 is a silicon layer molded to the second layer 130 by an over molding operation. The third layer 150 may combine with the first layer 120 to cover and hide the second layer 130, as well as the aforementioned openings and elastic materials of the second layer 130. Also, although not shown, the first layer 120 may be adhesively secured with the second layer 130. Further, in some embodiments (not shown), the first layer 120 and the third layer 150 are replaced by leather, or pseudo-leather, that may wrap around and cover the second layer 130, as well as the aforementioned openings and elastic materials of the second layer 130.

Figure 4:
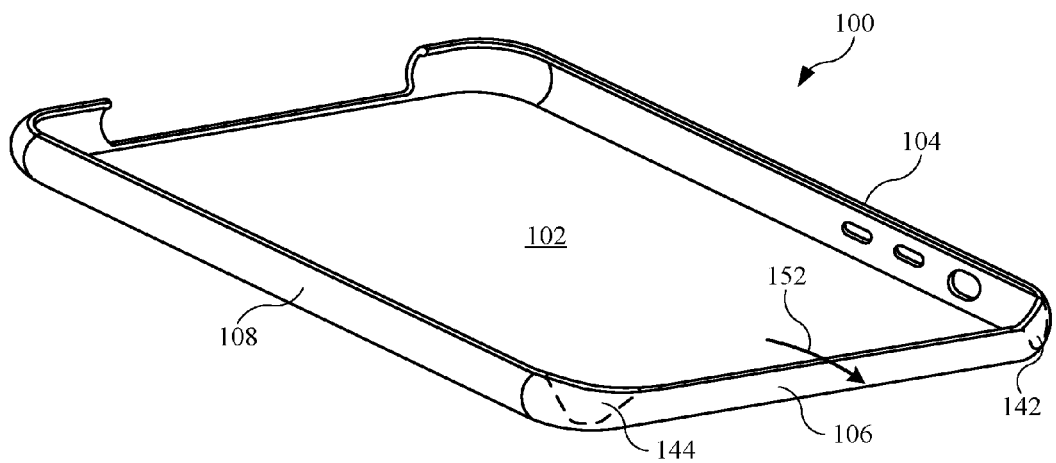
FIG. 4 illustrates an isometric view of the accessory device and the elastic material disposed in corners of the accessory device, showing the movement of the sidewalls in conjunction with the elastic material.

FIG. 4 illustrates an isometric view of the accessory device 100 and the elastic material disposed in corners of the accessory device 100, showing the movement of the sidewalls in conjunction with the elastic material. As shown, the first elastic material 142 is positioned between the first sidewall 104 and the second sidewall 106 at a first corner of the accessory device 100, and the second elastic material 144 is positioned between the second sidewall 106 and the third sidewall 108 at a second corner of the accessory device 100. It should be noted that the first elastic material 142 and the second elastic material 144 (shown as dotted) are embedded between the first layer 120 and the third layer 150 (shown in FIG. 3). Based upon the elastic materials, the sidewalls may move or bend independently with respect to other sidewalls. For example, as shown in FIG. 4, the second sidewall 106, in response to a force (in a direction of an arrow 152), may move or bend independently with respect to the first sidewall 104 and the third sidewall 108, based upon elastic stretching of the first elastic material 142 and the second elastic material 144. While the arrow 152 denotes an outward movement in a direction away from the base region 102, the second sidewall 106 may also bend or move independently inward in a direction toward the base region 102. In a similar manner, the first sidewall 104, in response to a force, may move or bend independently with respect to the second sidewall 106, based upon an elastic stretching of the first elastic material 142. Also, in a similar manner, the third sidewall 108, in response to a force, may move or bend independently with respect to the second sidewall 106, based upon an elastic stretching of the second elastic material 144. Accordingly, the first sidewall 104 and the third sidewall 108 may bend or move inward or outward depending upon a direction of the applied force.

With the sidewalls designed to move or bend in the described manner, the accessory device 100 may facilitate an insertion of an electronic device into the accessory device 100, and/or an extraction of an electronic device from the accessory device 100. Also, the first elastic material 142 and the second elastic material 144 may allow the accessory device 100 to regain some of the structural integrity lost by the second layer 130 (shown in FIG. 3) having the first opening 132 and the second opening 134 (also shown in FIG. 3). Further, the first elastic material 142 and the second elastic material 144 may combine with the aforementioned sidewalls, allowing the accessory device 100 to retain an electronic device in the event of a load or force to the accessory device 100.

Figure 5:
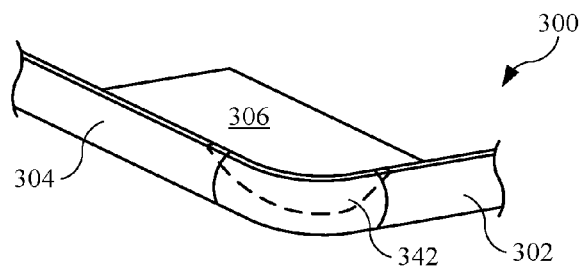
FIG. 5 illustrates a partial isometric view of an alternative embodiment of an accessory device in accordance with the described embodiments, with the elastic material extending into the sidewalls.
Figure 6:
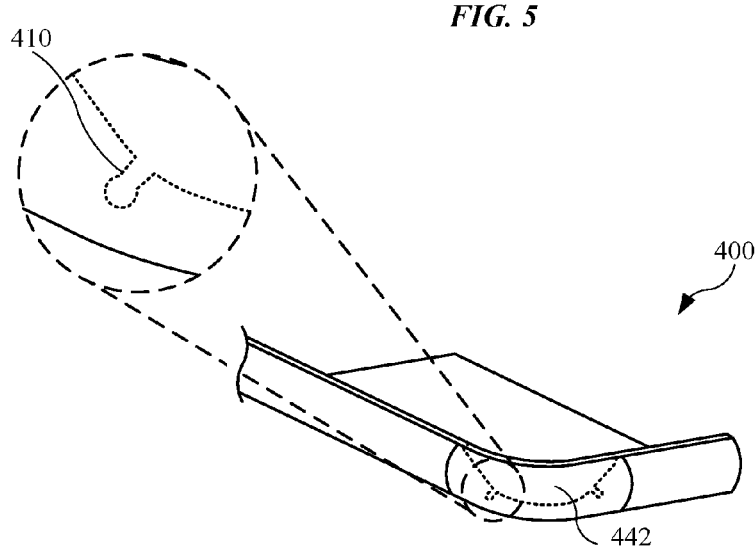
FIG. 6 illustrates a partial isometric view of an alternative embodiment of an accessory device in accordance with the described embodiments, with the accessory device having an opening that defines a lock mechanism.

FIGS. 5 and 6 illustrate an alternative embodiment of an accessory device having alternate openings. The alternate openings include alternate shapes and sizes. In this regard, an elastic material disposed in the alternate openings may include a size and shape in accordance with the alternate openings.

FIG. 5 illustrates a partial isometric view of an alternative embodiment of an accessory device 300 in accordance with the described embodiments, with the elastic material 342 extending into a first sidewall 302 and a second sidewall 304 of the accessory device 300. The accessory device 300 may include any number of layers previously described for an accessory device. Also, a shell (not shown) covered by one or more layers may include an opening to receive the elastic material 342. As shown, the opening, and in turn, the elastic material 342 does not extend to a base region 306 of the accessory device 300. This may allow for additional rigidity of the accessory device 300.

FIG. 6 illustrates a partial isometric view of an alternative embodiment of an accessory device 400 in accordance with the described embodiments, with the accessory device 400 having an opening that defines a lock mechanism. As shown in the enlarged view, a first lock mechanism 410 may be defined as an extended cavity in an opening of a shell (not shown) surrounded by one or more layers in a manner previously described. In this manner, when the elastic material 442 is molded into an opening of the shell, the (pre-cured) liquid material defining the elastic material 442 may extend into the first lock mechanism 410. The elastic material 442 may also extend into a second lock mechanism (not labeled), as shown in FIG. 6. When the liquid material cures, the elastic material 442 is mechanically interlocked with the shell. The lock mechanisms may provide additional means for maintaining the elastic material positioned in the accessory device 400 between the sidewalls.

Figure 7:
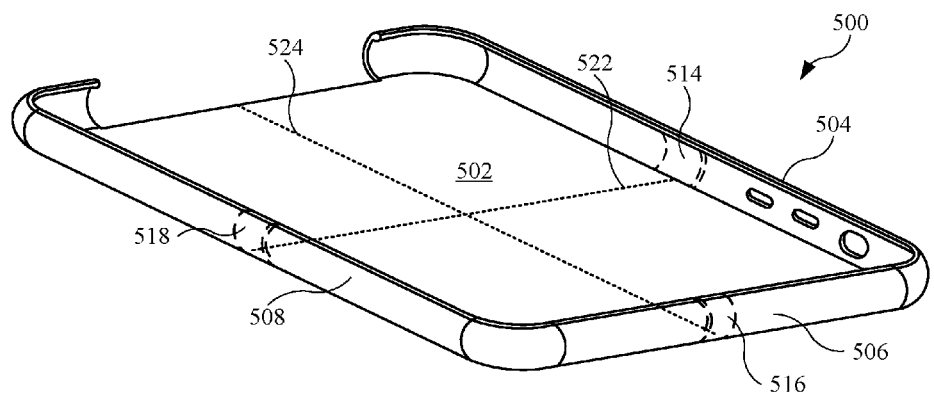
FIG. 7 illustrates an isometric view of an alternate embodiment of an accessory device having openings in the sidewalls, with the openings receiving an elastic material.

FIG. 7 illustrates an isometric view of an alternate embodiment of an accessory device 500 having openings in the sidewalls, with the openings receiving an elastic material. For example, the accessory device 500 may include a first sidewall 504, a second sidewall 506, and a third sidewall 508 having a first elastic material 514, a second elastic material 516, and a third elastic material 518, respectively. As shown, the elastic materials are generally located in a central region of their respective sidewalls. A second layer (not shown) formed from a rigid PC material, for example, may include openings to receive the first elastic material 514, the second elastic material 516, and the third elastic material 518. With the elastic material disposed along the central regions the sidewalls, a force may be applied to a base region 502 of the accessory device 500, causing the accessory device 500 to bend or move along one or more centerlines. For example, the accessory device 500 may bend along a first centerline 522 in response to a force, causing the first elastic material 514 and the third elastic material 518 to elastically stretch. Alternatively, the accessory device 500 may bend along a second centerline 524 in response to a force, causing the second elastic material 516 to elastically stretch. It should be noted that the elastic material shown in FIG. 7 may include any materials or features previously described for an elastic material.

Figure 8:
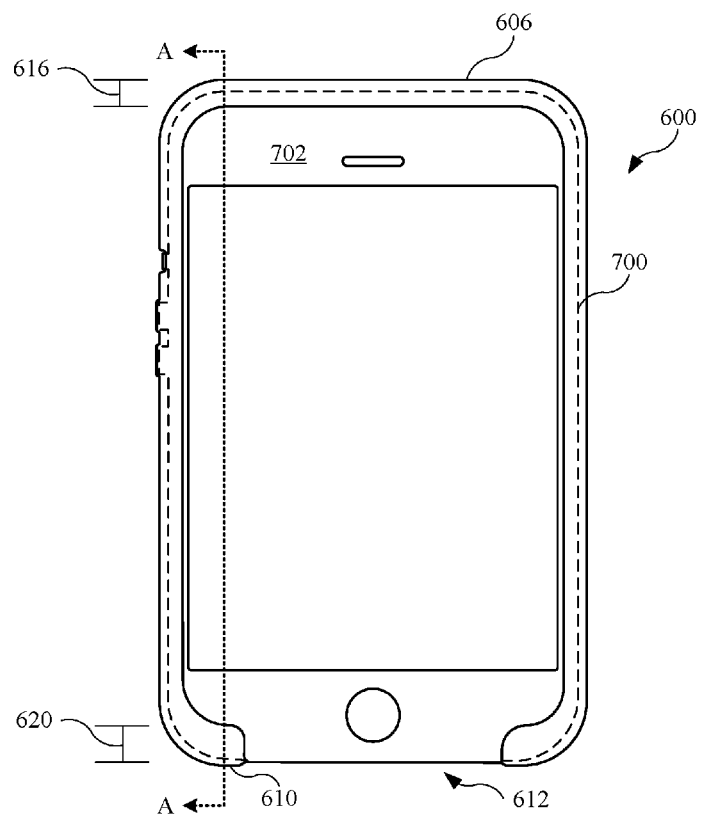
FIG. 8 illustrates a plan view of an embodiment of an accessory device having an electronic device disposed in the accessory device, further showing the accessory device having sidewalls that define an asymmetric geometry of the accessory device, in accordance with the described embodiments.

In some instances, alterations to the sidewalls may cause an electronic device to eject or exit from an accessory device in an undesired manner, for example when the accessory device (carrying the electronic device) is dropped. However, the sidewalls may include additional modifications in order to provide an enhanced retaining force to the electronic device. For example, FIG. 8 illustrates a plan view of an embodiment of an accessory device 600 having an electronic device 700 disposed in the accessory device 600, further showing the accessory device 600 having sidewalls that define an asymmetric geometry of the accessory device 600, in accordance with the described embodiments. As shown, the accessory device 600 may include a first sidewall 606 that wraps around and extends to a first distance 616 over the electronic device 700, with a portion of the first sidewall 606 covering a portion of a protective layer 702 of the electronic device 700. The accessory device 600 may also include a second sidewall 610 (separated by a channel 612) that wraps around and extends to a second distance 620 over the electronic device 700, with a portion of the second sidewall 610 covering a portion of the protective layer 702. As shown in FIG. 8, the second distance 620 is greater than the first distance 616, and, accordingly, the accessory device 600 includes asymmetric geometry due in part to in part to the differing lengths of the sidewalls. The additional length provided by the second distance 620 of the second sidewall 610 may increase the retention capabilities of the accessory device 600 by increasing the retention force provided to the electronic device 700.

Figure 9:
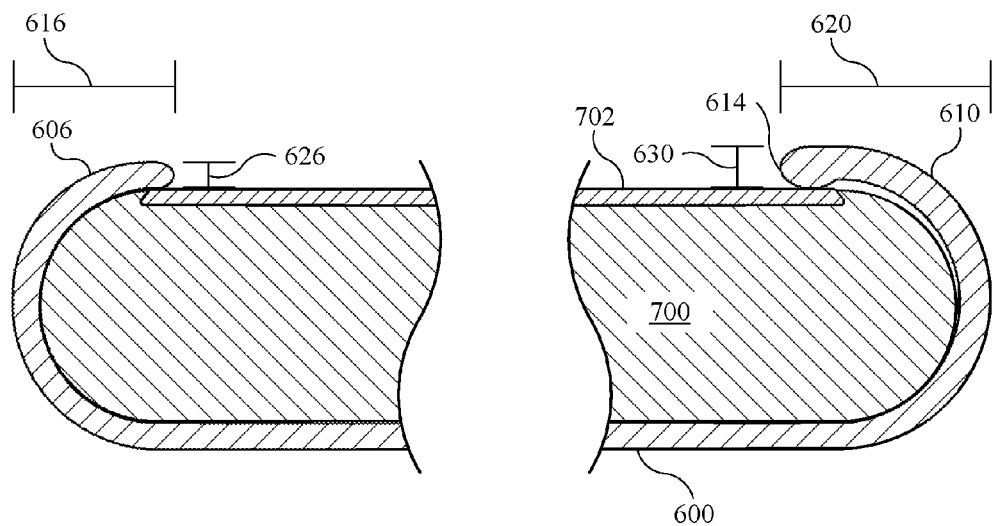
FIG. 9 illustrates a side view of the accessory device and electronic device shown in FIG. 8 taken along line A-A, showing additional geometric features of the accessory device.

FIG. 9 illustrates a side view of the accessory device 600 and electronic device 700 shown in FIG. 8 taken along line A-A, showing additional geometric features of the accessory device 600. As previously shown, the first sidewall 606 extends to the first distance 616 and the second sidewall 610 may extend to the second distance 620 greater than the first distance 616. Accordingly, the second sidewall 610 extends to a greater distance over the protective layer 702 than that of the first sidewall 606. Further, the first sidewall 606 may include a first length based in part on the first distance 616, and the second sidewall 610 may include a second length greater than the first length based in part on the second distance 620 being greater than the first distance 616.

FIG. 9 further shows the accessory device 600 having additional asymmetric features. For example, the first sidewall 606 may include a first thickness 626 in a location over the protective layer 702, and the second sidewall 610 may include a second thickness 630 in a location over the protective layer 702. As shown, the second thickness 630 is greater than the first thickness 626. When the electronic device 700 includes curved sidewalls, the sidewalls of the accessory device 600 may also include curved surfaces with a curvature generally corresponding to a curvature of the electronic device 700. In these instances, some materials used to form the accessory device 600 (such as leather) may cause the second sidewall 610 to extend away from the electronic device 700, causing a small clearance between the sidewalls and the electronic device. For example, as shown in FIG. 9, the second sidewall 610 is separated from the electronic device 700 by a small gap or space between the second sidewall 610 and the electronic device 700. However, the second sidewall 610 may include an extension 614, or bulb-like feature, that is not only designed to engage the protective layer 702, but also to provide a retaining force to the electronic device 700. Accordingly, the second sidewall 610 may provide a retaining force both by its additional length and also by its additional thickness (defined by the extension 614), as compared to the first sidewall 606. In other words, the extension 614 may prevent unwanted movement of the electronic device 700 into the gap. Also, the extension 614 defines an additional asymmetric property of the accessory device 600. It should be noted that the features shown for an accessory device 600 in FIGS. 8 and 9 may be combined with other features, such as the openings and elastic material, shown and described in previous embodiments.

Figure 10:
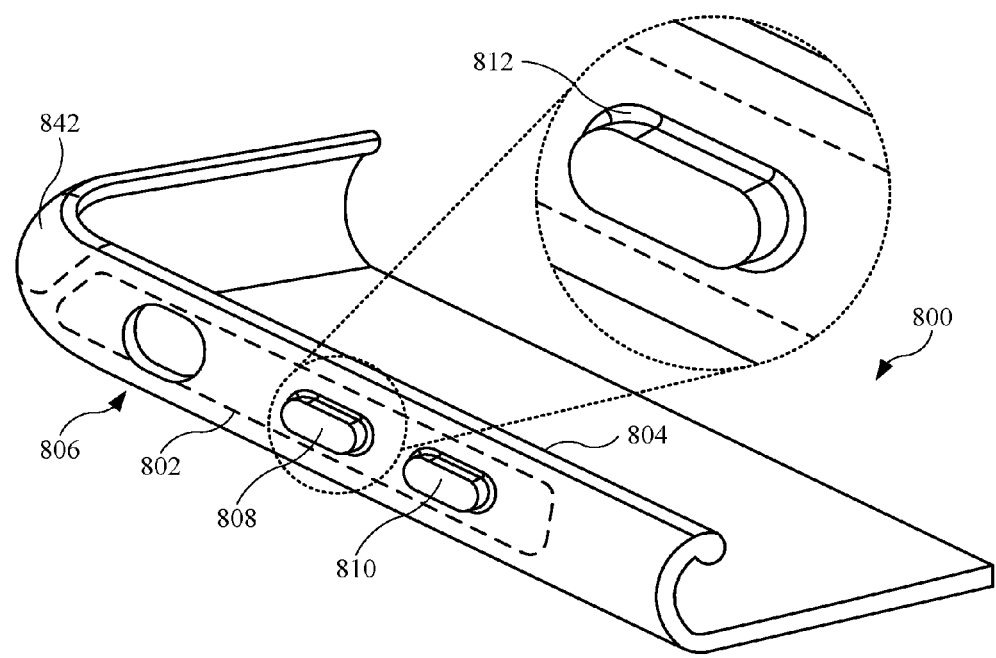
FIG. 10 illustrates a partial isometric view of an embodiment of an accessory device having a protective layer disposed in a sidewall of the accessory device, in accordance with the described embodiments.

FIG. 10 illustrates a partial isometric view of an embodiment of an accessory device 800 having a protective layer 802 disposed in a sidewall 804 of the accessory device 800, in accordance with the described embodiments. In some embodiments, the protective layer 802 includes a fibrous material that includes a multifilament yarn formed from a liquid crystal polymer. Further, in some embodiments, the protective layer 802 is adhesively secured with one or more layers in the sidewall 804. Also, the protective layer 802 may be embedded between two or more layers that form the sidewall 804. In this manner, the protective layer 802 may provide support to features along the sidewall 804, such as an opening 806, a first protruding feature 808, and a second protruding feature 810. Also, as shown, the protective layer 802 is angled to avoid contact with an elastic material 842 (similar to an elastic material previously described). Further, in some embodiments, the protruding features may include recessed regions. For example, as shown in the enlarged view, the first protruding feature 808 may include a recessed region 812 defined as an indention surrounding the first protruding feature 808. This will be described below.

Figure 11:
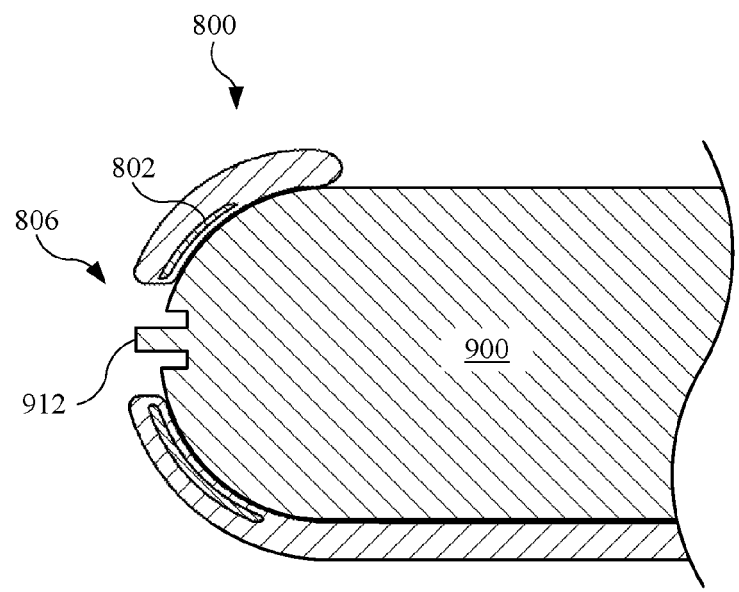
FIG. 11 illustrates partial cross sectional view of the accessory device shown in FIG. 10, showing an electronic device disposed in the accessory device, and further showing the protective layer used to provide support to the opening of the accessory device.

FIG. 11 illustrates partial cross sectional view of the accessory device 800 shown in FIG. 10, further showing an electronic device 900 disposed in the accessory device 800 and also showing the protective layer 802 used to provide support to the opening 806 of the accessory device 800. As shown, the protective layer 802 is embedded in the accessory device 800 and hidden from view, while acting as a splint to provide reinforcement to the opening 806. While the opening 806 is designed to allow access to a switch 912 of the electronic device 900, in other embodiments, the opening 806 is designed and positioned to allow access to a port for an audio jack of the electronic device 900, or some other input-output feature of the electronic device 900.

Figure 12:
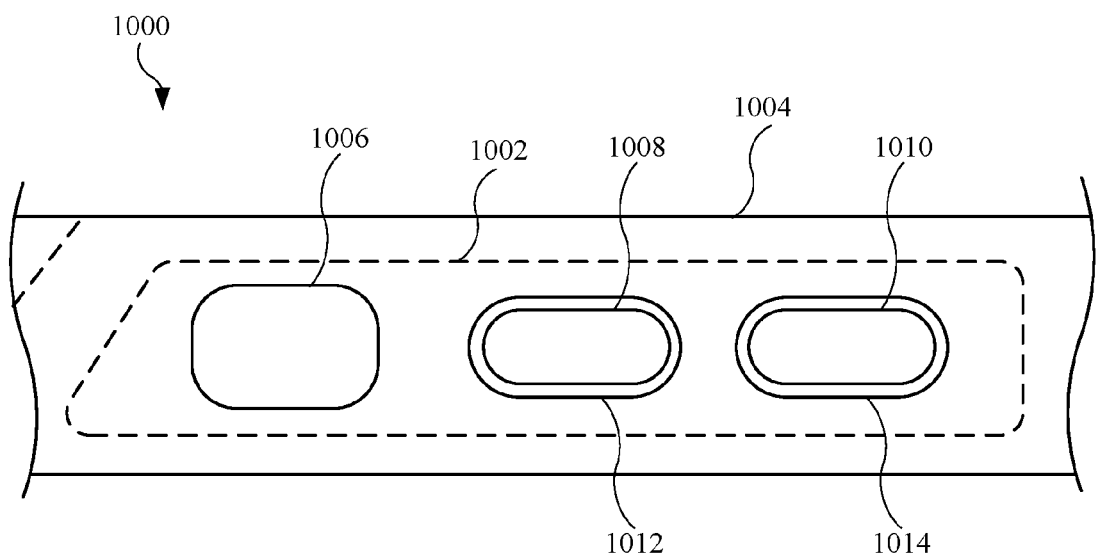
FIG. 12 illustrates a partial side view of an alternate embodiment of an accessory device having a material wrapped around an exterior of the accessory device, in accordance with the described embodiments.

FIG. 12 illustrates a partial side view of an alternate embodiment of an accessory device 1000 having a material wrapped around an exterior of the accessory device 1000, in accordance with the described embodiments. In some embodiments, the material of the accessory device 1000 includes leather that surrounds the accessory device 1000. In this regard, the leather may undergo one or more operations to define several protruding features, such as a first protruding feature 1008 and a second protruding feature 1010. For example, the accessory device 1000 may include a sidewall 1004 that undergoes a de-boss operation (not shown) in order to press a leather layer, or layers, together to define the first protruding feature 1008 and the second protruding feature 1010 on the sidewall 1004. The de-boss operation may also define recessed regions surrounding the protruding feature. For example, the first protruding feature 1008 and the second protruding feature 1010 may include a first recessed region 1012 and a second recessed region 1014, respectively (similar to the recessed region 812, shown in FIG. 10). The first recessed region 1012 and the second recessed region 1014 may be designed to further define and/or enhance an appearance of the first protruding feature 1008 and the second protruding feature 1010, respectively. Also, in some embodiments, the sidewall 1004 may include a protective layer 1002 that not only supports an opening 1006 of the sidewall 1004, but also supports the first protruding feature 1008 and/or the second protruding feature 1010. The protective layer 1002 may include any feature or features previously described for a protective layer in a sidewall, such as the protective layer 802 (shown in FIGS. 10 and 11).

FIGS. 13-16 illustrate a process for forming a protruding feature having a recessed region surrounding the protruding feature. For example, the process shown in FIGS. 13-16 may be used to form the first protruding feature 1008 and the first recessed region 1012 of the accessory device 1000 shown in FIG. 12. In this regard, FIGS. 13-16 show an enlarged portion of a sidewall of an accessory device in accordance with the described embodiments.

Figure 13:
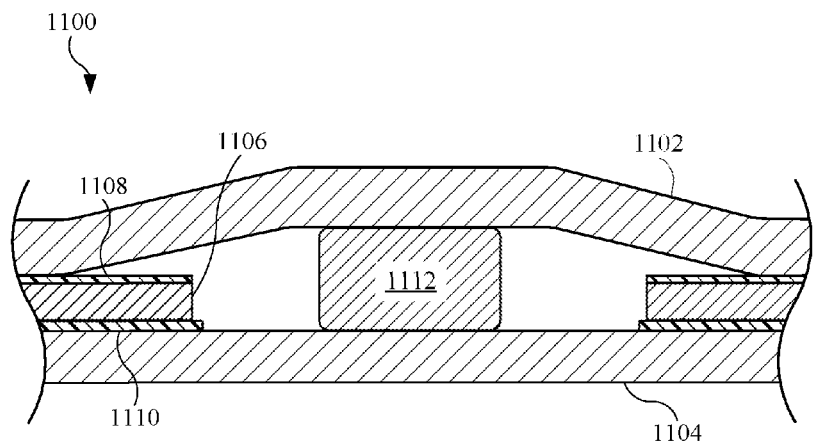
FIG. 13 illustrates a partial cross sectional view of an embodiment of an accessory device, showing a first layer and a second layer surrounding a central layer, in accordance with the described embodiments.

FIG. 13 illustrates a partial cross sectional view of an embodiment of an accessory device 1100, showing a first layer 1102 and a second layer 1104 surrounding a central layer 1106, in accordance with the described embodiments. In some embodiments, the first layer 1102 and the second layer 1104 are formed from leather. However, other aesthetic layers are possible. In some embodiments, the central layer 1106 is formed form PC or nylon, and includes a shape similar to that of the second layer 130 (shown in FIG. 3). Also, in some embodiments, a single piece of leather is used to wrap around the central layer 1106 and define the first layer 1102 and the second layer 1104. Also, the first layer 1102 and the second layer 1104 may be adhesively secured with the central layer 1106 by a first adhesive layer 1108 and a second adhesive layer 1110, respectively. Also, in some embodiments (not shown), a protective layer similar to the protective layer 802 (shown in FIG. 10) is disposed between the first layer 1102 and the second layer 1104 to provide additional support.

Further, in some embodiments, a fill material 1112 is positioned between, and bound by, the first layer 1102 and the second layer 1104. In other words, the first layer 1102 and the second layer 1104 may enclose the fill material 1112. Also, the fill material 1112 may be used to support a protruding feature formed by subsequent processes described below. In some embodiments, the fill material 1112 is a compressible material. In other embodiments, the fill material 1112 is a flexible material. In the embodiment shown in FIG. 13, the fill material 1112 is a rigid material, such as include PC or nylon.

Figure 14:
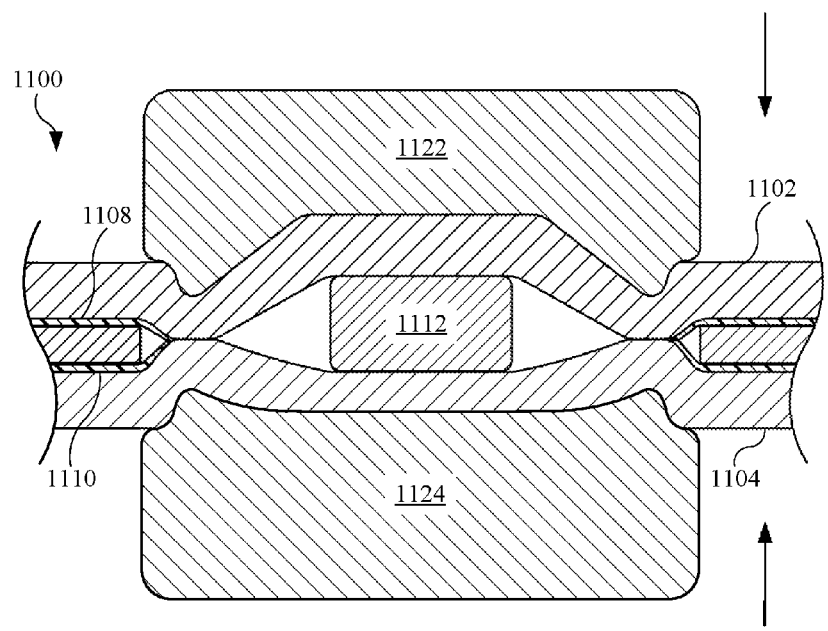
FIG. 14 illustrates the cross sectional view of the accessory device shown in FIG. 13, further showing a first deforming tool and a second deforming tool.

FIG. 14 illustrates the cross sectional view of the accessory device 1100 shown in FIG. 13, further showing a deforming operation using a first deforming tool 1122 and a second deforming tool 1124. Both the first deforming tool 1122 and the second deforming tool 1124 engage first layer 1102 and the second layer 1104, respectively, causing a deformation force to engage the first layer 1102 with the second layer 1104. In some embodiments, the first deforming tool 1122 and the second deforming tool 1124 are de-boss tools designed to perform a de-boss operation in order to form a desired indention, or recessed region, in the first layer 1102 and the second layer 1104, respectively. Also, the first deforming tool 1122 and the second deforming tool 1124 may press together the first layer 1102 and the second layer 1104 and adhesively bond the layers via the first adhesive layer 1108 and the second adhesive layer 1110.

Figure 15:
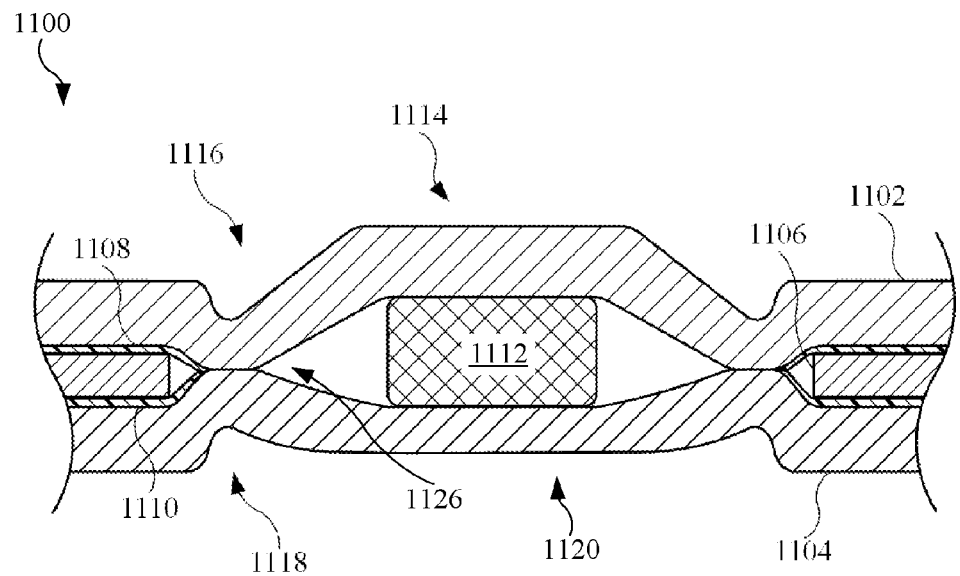
FIG. 15 illustrates a cross sectional view of the accessory device shown in FIG. 14, with the deforming tools removed after a deforming operation, which may include a de-boss operation.

FIG. 15 illustrates a cross sectional view of the accessory device 1100 shown in FIG. 14, with the deforming tools removed after the deforming operation. The deforming operation may define several new features in the layers used to form the accessory device 1100. For example, the first layer 1102 may include a protruding feature 1114. The protruding feature 1114 may be located in a region corresponding to a button of an electronic device (not shown). As shown, the protruding feature 1114 extends beyond (non-coplanar with) the first layer 1102 due in part to a counter-force applied by the fill material 1112 during the deforming operation. Accordingly, the fill material 1112 may provide stiffness and support to the protruding feature 1114. Also, the deforming operation may define a first recessed region 1116 surrounding the protruding feature 1114, with the first recessed region 1116 being below, or sub-flush, with respect to the first layer 1102. Further, the first recessed region 1116 may define an edge of the protruding feature 1114. In this manner, the protruding feature 1114 and the first recessed region 1116 may be substantially similar to protruding features and recessed regions, respectively, previously described (for example, in FIGS. 10 and 12). As such, when an electronic device (not shown) is positioned in the accessory device 1100, a force applied to the protruding feature 1114 may correspond to a depression of a button of the electronic device in order to input a command to the electronic device. Also, in some embodiments (not shown) the protruding feature 1114 may be referred to as an integrally formed protruding feature, as the protruding feature 1114 may be formed from the same material as that of the first layer 1102.

Further, the deforming operation may also define a second recessed region 1118 similar to that of the first recessed region 1116. Whereas the first recessed region 1116 (and the protruding feature 1114) may be on an exterior of the accessory device 1100, the second recessed region 1118 may be on an interior of the accessory device 1100 in a location corresponding to the first recessed region 1116.

Also, the deforming operation that bonds the first layer 1102 with the second layer 1104 may also prevent ingress of adhesives into a location associated with the fill material 1112 and the protruding feature 1114. For example, as shown in FIG. 15, both the first adhesive layer 1108 and the second adhesive layer 1110 terminate at a bonding location 1126 between the first layer 1102 and the second layer 1104. The bonding location 1126 may include a single bond that extends circumferentially around the fill material 1112 and the protruding feature 1114. By limiting or preventing adhesives between the bonding locations, the protruding feature 1114 may be free of unwanted stiffness that limits prevents movement of the protruding feature 1114. However, in some embodiments, a material in addition to the fill material 1112 may be positioned between the aforementioned bonding locations to provide a desired stiffness.

Also, FIG. 15 shows the second layer 1104, based upon the deformation operation (shown in FIG. 14), may include an indention 1120 designed to receive at least a portion of button (not shown) of an electronic device. The indention 1120 may be sub-flush with respect to a surface of the second layer 1104, as shown in FIG. 15. Accordingly, the second deforming tool 1124 (shown in FIG. 14) may include a shape corresponding to the indention 1120. Also, as shown in FIG. 15, the second recessed region 1118 may surround the indention 1120.

Figure 16:
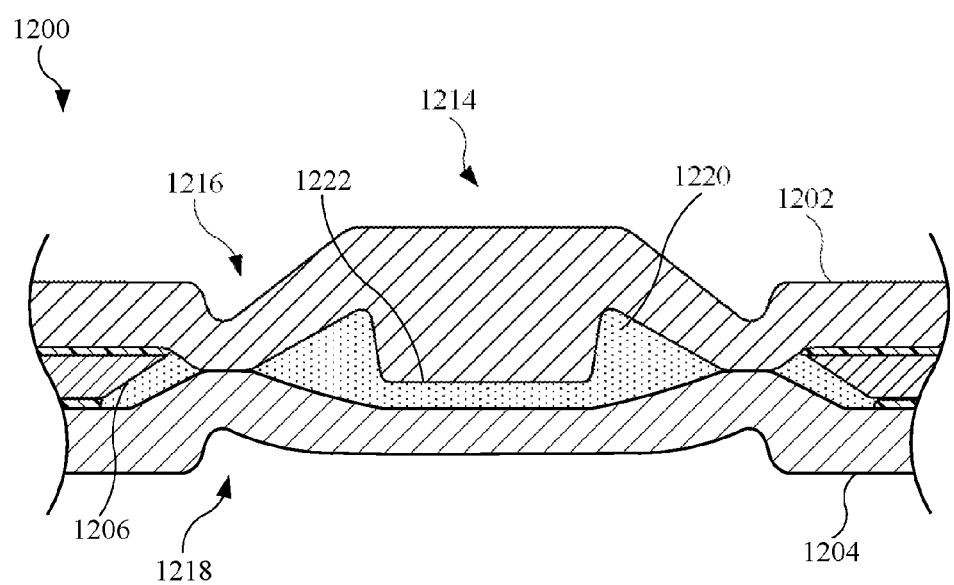
FIG. 16 illustrates a cross sectional view of an alternate embodiment of an accessory device, showing the accessory device having a protruding feature with features designed to provide support to the protruding feature.

FIG. 16 illustrates a cross sectional view of an alternate embodiment of an accessory device 1200, showing the accessory device 1200 having a protruding feature 1214 with features designed to provide support to the protruding feature 1214. In order to increase the flexibility of the protruding feature 1214, a fill material (shown in FIG. 15) may be removed. Similar to the previous embodiment, the protruding feature 1214 may extend beyond (above) a surface of a first layer 1202 of the accessory device 1200. However, the protruding feature 1214 may also include a chamfered region 1222 integrally formed from the first layer 1202, with the chamfered region 1222 extending toward a second layer 1204 of the accessory device 1200. As shown, the chamfered region 1222 may slope or narrow is it extends toward the second layer 1204. Also, a fill material 1220 may be used to provide additional to support to the protruding feature 1214 and the chamfered region 1222. The fill material 1220 may be, as a non-limiting example, a flexible or an elastomer material.

Also, as shown in FIG. 16, the fill material 1220 extends beyond a first recessed region 1216 and a second recessed region 1218, and in particular, beyond a bonding location between the first layer 1202 and a second layer 1204. However, in other embodiments, the fill material 1220 extends only to the first recessed region 1216 and the second recessed region 1218, or alternatively, a bonding location between the first layer 1202 and the second layer 1204. Also, in order to provide additional clearance from the first recessed region 1216 and the second recessed region 1218, a central layer 1206 of the accessory device 1200 is chamfered, as shown in FIG. 16. Also, it should be noted that several features for accessory devices shown in FIGS. 10-16 may be combined with other features, such as the openings and elastic material, shown and described in previous embodiments.

Figure 17:
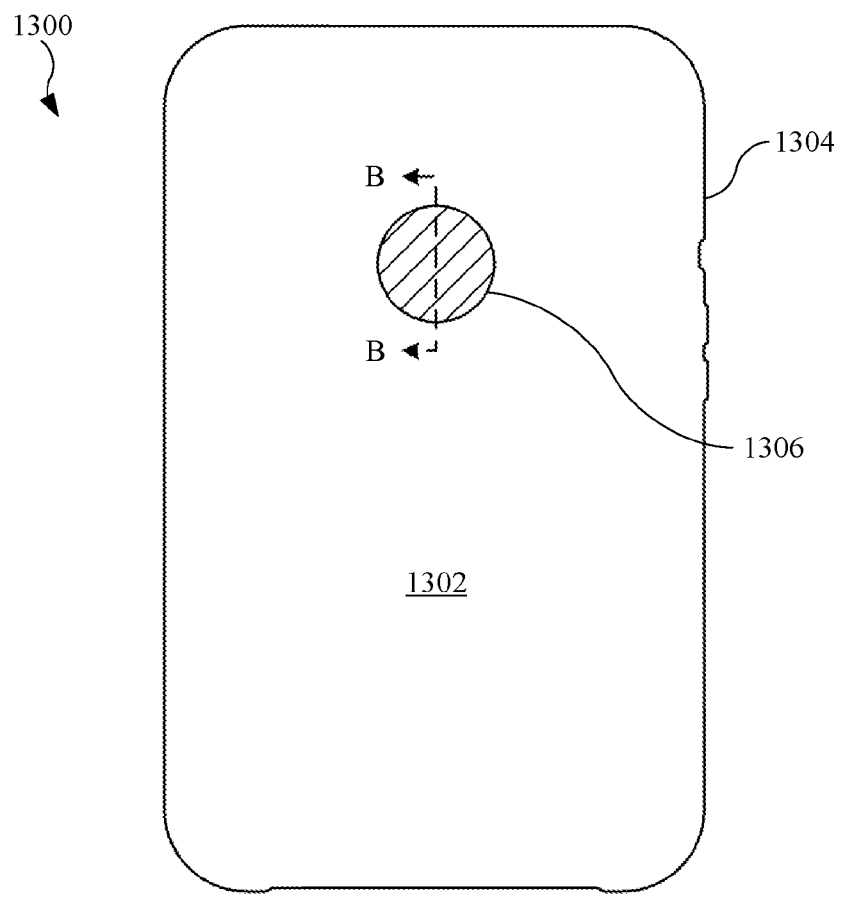
FIG. 17 illustrates a plan view of an embodiment of an accessory device, showing a base region having a first layer of a first appearance and a second layer of a second appearance different than the first appearance.

FIG. 17 illustrates a plan view of an embodiment of an accessory device 1300, showing a base region 1302 having a first layer 1304 of a first appearance and a second layer 1306 of a second appearance different than the first appearance. In some embodiments, the first layer 1304 and the second layer 1306 include leather of different appearances, with the difference in appearance including color and/or texture. The first layer 1304 may substantially cover the base region 1302 and several sidewalls (not shown). The second layer 1306 may take the form of an indicium, representing a letter, symbol, or logo. Also, the indicium may represent a manufacturer of the accessory device 1300. A two-tone leather makeup may improve an overall aesthetic appearance of the accessory device 1300. Although no shown, in other embodiments, the first layer 1304 and the second layer 1306 are formed from a silicone material or other polymeric material.

Figure 18:
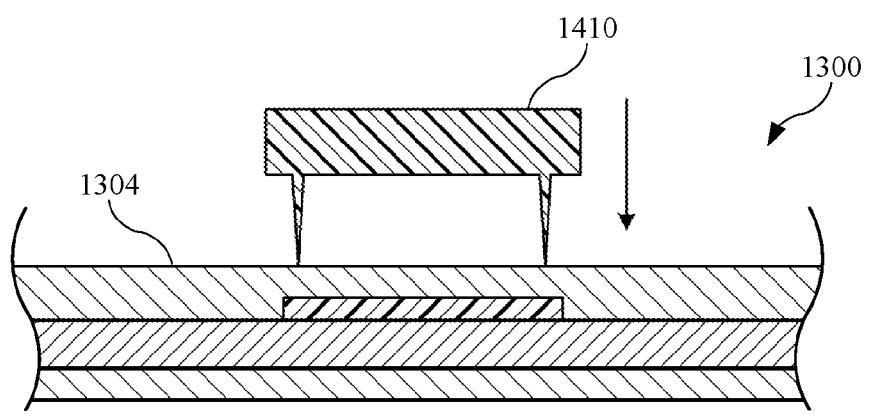
FIG. 18 illustrates a partial cross sectional view of an accessory device taken along line B-B in FIG. 17, showing the first layer undergoing a cutting operation, in accordance with the described embodiments.

FIGS. 18-22 illustrate an exemplary process used to form the accessory device 1300. FIG. 18 illustrates a partial cross sectional view of an accessory device 1300 taken along line B-B in FIG. 17, showing the first layer 1304 undergoing a cutting operation, in accordance with the described embodiments. In some embodiments, the first layer 1304 includes leather having a first appearance derived from a color and/or texture. Also, the cutting operation may include a cutting tool 1410 designed to remove the first layer 1304 according to a desired size and shape, such as a size and a shape of an indicium previously described. The cutting tool 1410 may include a die cut tool that performs a die cutting operation to at least the first layer 1304.

Figure 19:
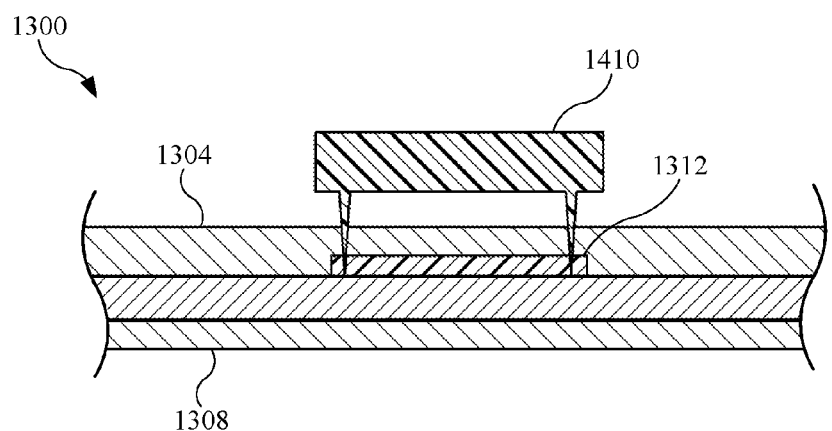
FIG. 19 illustrates a partial cross sectional view of the accessory device shown in FIG. 18, further showing the cutting tool penetrating the first layer and a sacrificial layer disposed behind the first layer.

FIG. 19 illustrates a partial cross sectional view of the accessory device 1300 shown in FIG. 18, further showing the cutting tool 1410 penetrating the first layer 1304 and a sacrificial layer 1312 disposed behind the first layer 1304. The sacrificial layer 1312 is designed to prevent the cutting tool 1410 from cutting additional layers, such as a third layer 1308 and a central layer 1318 (or support layer) between the first layer 1304 and the third layer 1308.

Figure 20:
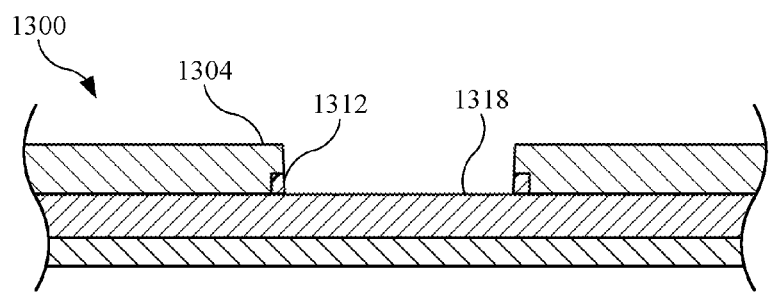
FIG. 20 illustrates a partial cross sectional view of the accessory device shown in FIG. 19, showing a portion of the first layer and a portion of the sacrificial layer removed.

FIG. 20 illustrates a partial cross sectional view of the accessory device 1300 shown in FIG. 19, showing a portion of the first layer 1304 and a portion of the sacrificial layer 1312 removed. After the cutting operation, the accessory device 1300 includes a void or space in the form of an indicium. Also, as shown, the size of the sacrificial layer 1312 is slightly larger than the size of the indicium to ensure the cutting tool (shown in FIG. 19) does not contact the central layer 1318.

Figure 21:
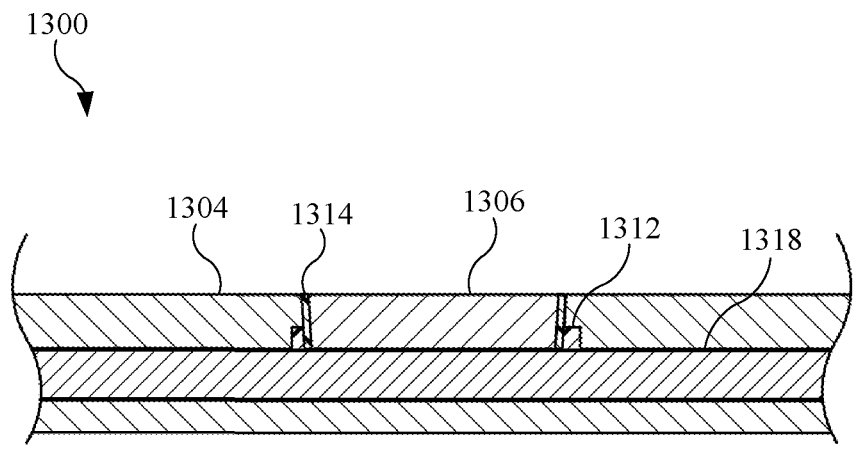
FIG. 21 illustrates a partial cross sectional view of the accessory device shown in FIG. 20, showing a second layer disposed in an opening defined by the removed portions of the first layer and the sacrificial layer.

FIG. 21 illustrates a partial cross sectional view of the accessory device 1300 shown in FIG. 20, showing a second layer 1306 disposed in an opening defined by the removed portions of the first layer 1304 and the sacrificial layer 1312. The second layer 1306 may include leather having a second appearance derived from a color and/or texture different from that of the first layer 1304. Also, the second layer 1306 may include an adhesive 1314 surrounding the second layer 1306. The adhesive 1314 may include an adhesive film designed to bond with the first layer 1304. Also, although not shown, the second layer 1306 may be adhesively secured with the central layer 1318.

Figure 22:
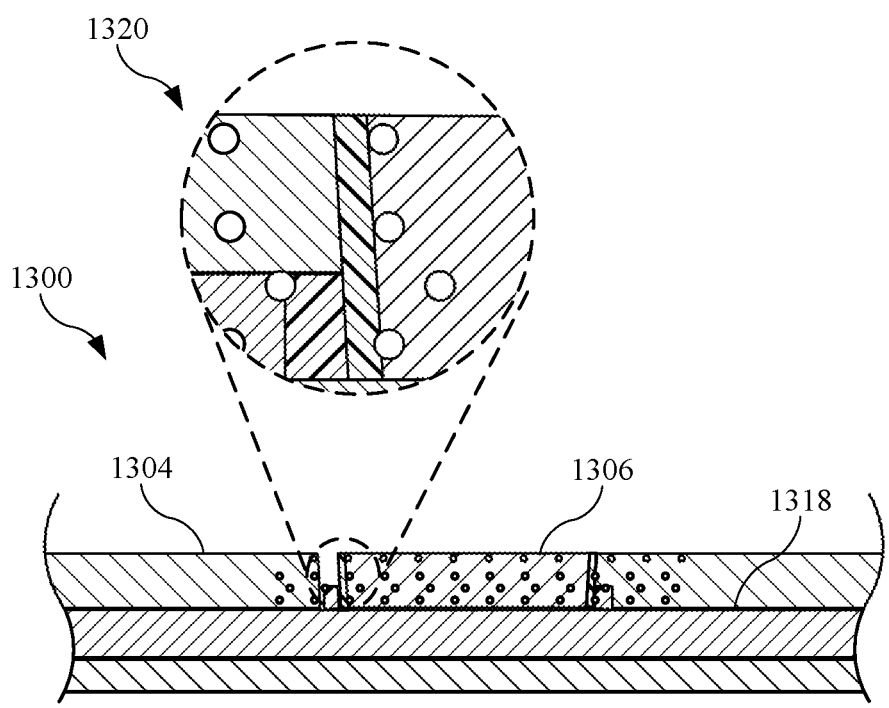
FIG. 22 illustrates a partial cross sectional view of the accessory device shown in FIG. 21, subsequent to an adhesive sprayed over the first layer and the second layer.

FIG. 22 illustrates a partial cross sectional view of the accessory device 1300 shown in FIG. 21, subsequent to an adhesive spray 1320 disposed over the first layer 1304 and the second layer 1306. The adhesive spray 1320 includes a viscosity low enough to penetrate porous regions of the first layer 1304 and the second layer 1306, as shown in FIG. 22, allowing the adhesive spray 1320 to permeate into the fibers of the first layer 1304 and the second layer 1306. In this manner, when the adhesive spray 1320 cures, the first layer 1304 and the second layer 1306 may not only bond together, but also includes an increased stiffness. The adhesive spray 1320 may also assist the second layer 1306 from delamination, or decoupling, from the central layer 1318. Also, the adhesive spray 1320 may bond the second layer 1306 with the first layer 1304 and prevent delamination of the second layer 1306 from the first layer 1304.

Figure 23:
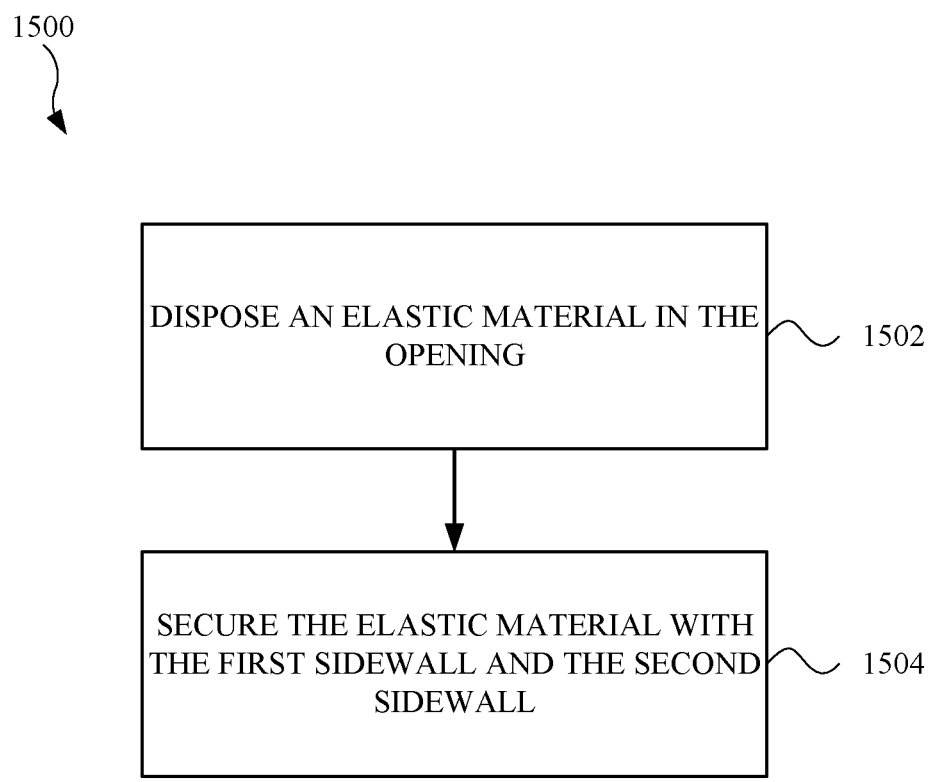
FIG. 23 illustrates a flowchart showing a method for assembling an accessory device suitable for use with a portable electronic device.

FIG. 23 illustrates a flowchart 1500 showing a method for assembling an accessory device suitable for use with a portable electronic device, in accordance with the described embodiments. In some embodiments, the accessory device includes a first sidewall, a second sidewall, and an opening between the first sidewall and the second sidewall. Also, a shell formed from PC may be used to define (in part) the first sidewall and the second sidewall.

In step 1502, an elastic material is disposed in the opening. The elastic material may include an elastomer or other elastically deformable material. Also, the elastic material may be formed from a material different from the first sidewall and the second sidewall.

In step 1504, the elastic material is secured with the first sidewall and the second sidewall. The elastic material is capable of elastically deforming in response to a force to the first sidewall that causes the first sidewall to move with respect to the second sidewall.

Figure 24:
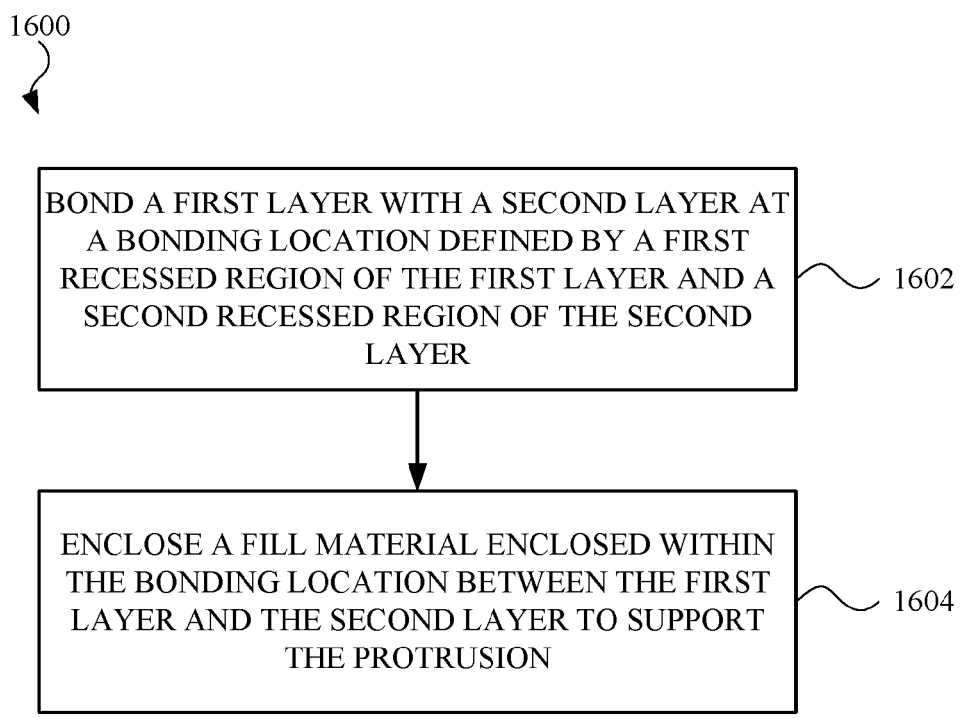
FIG. 24 illustrates a flowchart showing a method for forming an accessory device for an electronic device having a button, in accordance with the described embodiments.

FIG. 24 illustrates a flowchart 1600 showing a method for forming an accessory device for an electronic device having a button, in accordance with the described embodiments. In step 1602, a first layer is bonded with a second layer at a bonding location defined by a first recessed region of the first layer and a second recessed region of the second layer. The first layer may include a protrusion in a location corresponding to the button. The protrusion may be circumferentially surrounded by the first recessed region. The first layer may include leather, and the second layer may include PC.

In step 1604, a fill material is enclosed within the bonding location between the first layer and the second layer to support the protrusion. The fill material may include PC or an elastomer. Also, in some embodiments, the fill material is bound within the bonding location. In other embodiments, the fill material extends around the bonding location.

Also, in some embodiments, a central layer is positioned between the first layer and the second layer. The central layer may include a chamfered region that terminates at the bonding location. Further, both the first layer and the second layer may be adhesively secured with the central layer.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for an electronic device having a button, the accessory device comprising:
   a first layer that defines an exterior surface, the first layer comprising a protrusion that is external with respect to the exterior surface and in a location corresponding to the button, the first layer further comprising a first recessed region that is sub-flush with respect to the exterior surface and surrounding the protrusion;
   a second layer that defines an interior surface positioned to engage the electronic device, the second layer comprising a second recessed region that is sub-flush with respect to the interior surface, the second recessed region engaging the first recessed region at a bonding location defining an engagement between the first layer and the second layer, the bonding location circumferentially surrounding the protrusion;
   a fill material between the first layer and the second layer and enclosed within and retained by the engagement, the fill material supporting the protrusion; and
   a central layer between the first layer and the second layer, the central layer comprising a shell having a size and a shape in accordance with the portable electronic device, wherein the central layer comprises a chamfered region at a location corresponding to the protrusion and facing the second layer, and wherein the fill material engages the chamfered region.

2. The accessory device of claim 1, wherein:
   the first layer is adhesively bonded with the central layer with a first adhesive layer,
   the second layer is adhesively bonded with the central layer with a second adhesive layer, and
   the first adhesive layer and the second adhesive layer terminate at the bonding location.

3. The accessory device of claim 1, wherein the second layer includes an indentation that is sub-flush with respect to the interior surface.

4. The accessory device, of claim 3, wherein the second recessed region is sub-flush with respect to the indentation.

5. The accessory device of claim 1, further comprising a sidewall that includes the protrusion, wherein the sidewall further comprises:
   an opening; and
   a protective layer embedded in the sidewall and surrounding the opening, the protective layer including a fibrous material having a multifilament yarn formed from a liquid crystal polymer.

6. The accessory device of claim 1, wherein the first recessed region further defines the protrusion.

7. The accessory device of claim 1, wherein the first layer and the protrusion comprise leather.

8. The accessory device of claim 1, further comprising:
   a sacrificial layer embedded in the first layer formed from a first material, the sacrificial layer positioned between the first layer and the second layer such that the second layer is protected from a cut to the first layer and the sacrificial layer, the cut defining an opening based on a first removed portion of the first layer and a second removed portion of the sacrificial layer; and
   a third layer that fills the opening defined by the first removed portion and the second removed portion such that the first layer surrounds the third layer, the third layer formed from a second material different from the first material, wherein the third layer is co-planar with respect to the first layer; and an adhesive embedded in the first layer and the second layer.

9. An accessory device suitable for use with an electronic device, the accessory device comprising:

a first layer formed from a first material;

a second layer engaging the first layer;

a sacrificial layer embedded in the first layer, the sacrificial layer positioned between the first layer and the second layer such that the second layer is protected from a cut to the first layer and the sacrificial layer, the cut defining an opening based on a first removed portion of the first layer and a second removed portion of the sacrificial layer; and a third layer that fills the opening defined by the first removed portion and the second removed portion such that the first layer surrounds the third layer, the third layer formed from a second material different from the first material, wherein the third layer is co-planar with respect to the first layer; and an adhesive embedded in the first layer and the second layer.

10. The accessory device of claim 9, wherein the first layer comprises a first leather having a first appearance, and wherein the second layer comprises a second layer having a second appearance different from the first appearance.

11. The accessory device of claim 10, wherein the opening comprises a first size and wherein the sacrificial layer comprises a second size greater than the first size.

12. The accessory device of claim 9, wherein the first layer defines an exterior surface, and wherein the third layer comprises an indicium co-planar with respect to the exterior surface.

13. The accessory device of claim 12, wherein the adhesive surrounds the indicium.

14. The accessory device of claim 9, wherein the third layer is co-planar with respect to the first layer.

15. A method for forming an accessory device for an electronic device having a button, the method comprising:

bonding a first layer that defines an exterior surface of the accessory device with a second layer that defines an interior surface of the accessory device, wherein the first layer is bonded with the second layer at a bonding location defined by i) a first recessed region of the first layer that is sub-flush with respect to the exterior surface and ii) a second recessed region of the second layer that is sub-flush with respect to the interior surface, the first layer comprising a protrusion that is external with respect to the exterior surface and in a location corresponding to the button, the protrusion circumferentially surrounded by the first recessed region;

enclosing a fill material between the first layer and the second layer such that the fill material is enclosed within and retained by the bond of the first layer and the second layer, the fill material supporting the protrusion; and disposing a central layer between the first layer and the second layer, the central layer comprising a shell having a size and a shape in accordance with the portable electronic device, wherein the central layer comprises a chamfered region at a location corresponding to the protrusion and facing the second layer, and wherein the fill material engages the chamfered region.

16. The method of claim 15, wherein:

the first layer is adhesively bonded with the central layer with a first adhesive layer, the second layer is adhesively bonded with the central layer with a second adhesive layer, and the first adhesive layer and the second adhesive layer terminate at the bonding location.

17. The method of claim 15, wherein the chamfered region surrounds the bonding location.

18. The method of claim 15, wherein the fill material extends to the central layer.

19. The method of claim 15, wherein the chamfered region is at a location corresponding to the protrusion and facing the second layer.

20. The method of claim 15, wherein the first layer defines an exterior layer that comprises leather.

* * * * *